March 26, 1968  G. A. DELF  3,375,338
EXTENSION CORD CONTROL ASSEMBLY FOR ELECTRIC MOWER
Filed Dec. 17, 1965
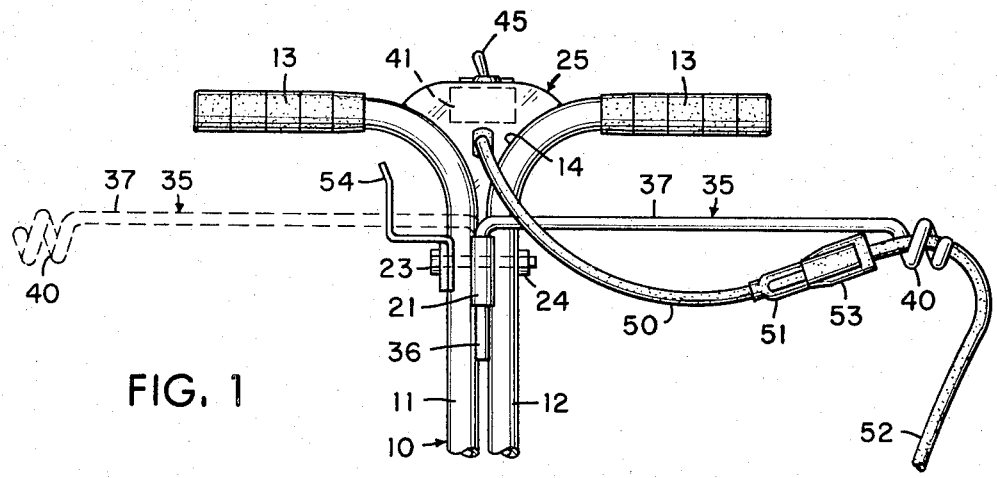
FIG. 1
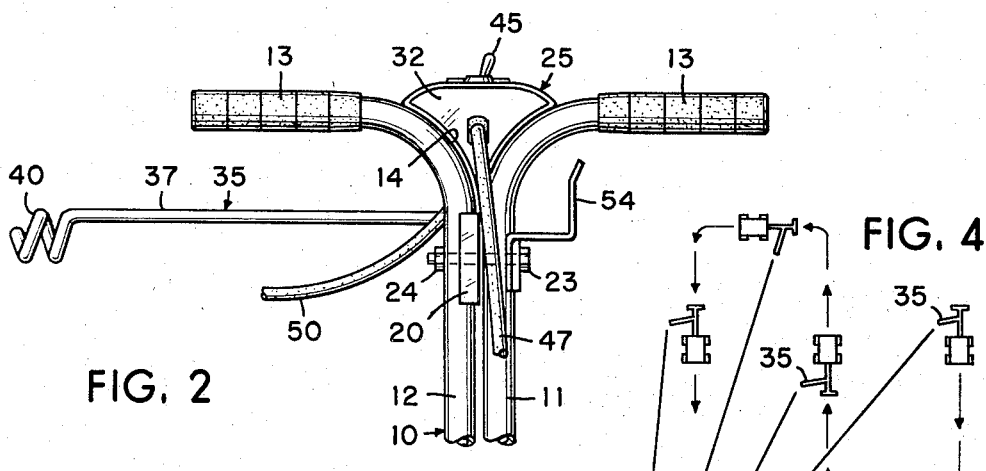
FIG. 2
FIG. 4
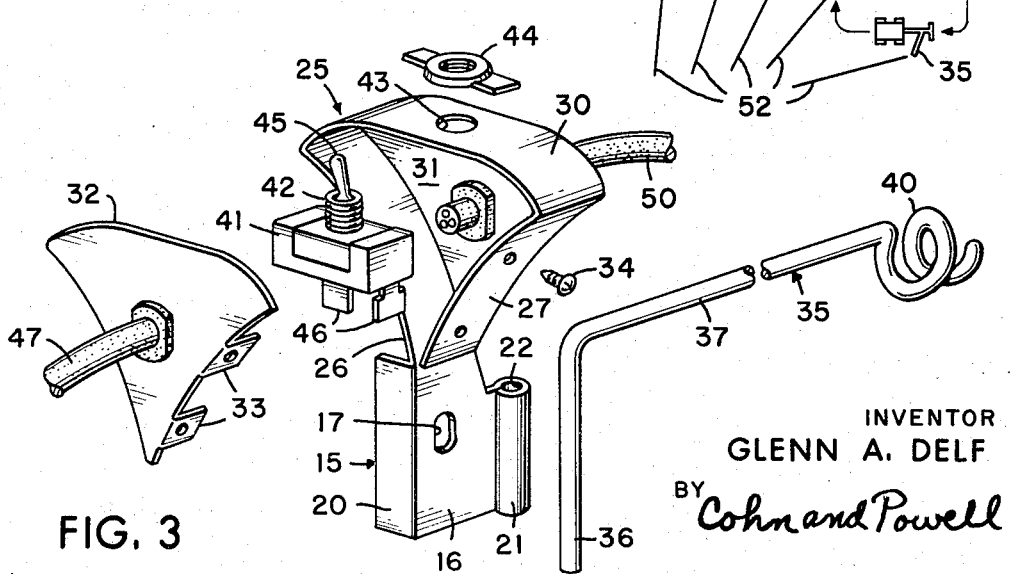
FIG. 3
INVENTOR
GLENN A. DELF
BY Cohn and Powell
ATTORNEYS › # United States Patent Office 3,375,338
Patented Mar. 26, 1968

3,375,338
EXTENSION CORD CONTROL ASSEMBLY
FOR ELECTRIC MOWER
Glenn A. Delf, St. Louis, Mo., assignor to Atlas Tool &
Manufacturing Company, a corporation of Missouri
Filed Dec. 17, 1965, Ser. No. 514,632
4 Claims. (Cl. 200—157)

ABSTRACT OF THE DISCLOSURE

The cord control assembly includes a bracket secured to the lawn mower handle, the bracket including a plate portion and a socket portion. An L-shaped control arm, pivotally mounted in the socket portion, extends laterally from the handle. The control arm includes a loop through which an extension cord extends. The extension cord includes an electrical connector connected to the electrical connector of a power cable which is connected to the power means. The control arm loop engages the extension cord so that tension in the extension cord is transferred to the control arm. When the included angle between the extension cord and the control arm is an acute angle the control arm can flip from one side to the other of the handle. The cord assembly bracket secured to the handle by a single fastener which extends through the plate portion of the bracket and through the handles. A flange on the plate portion cooperates with the handle to preclude rotation of the bracket about the fastener.

---

This invention relates generally to improvements in an electric lawn mower, and more particularly to an improved assembly for mounting and connecting the extension cord which facilitates usage of the mower by controlling the disposition of the cord under operating conditions.

Some of the serious disadvantages in using an electric lawn mower are caused by the trouble and time incurred in keeping the extension cord out from under the legs and feet of the operator and out of the path of the mower. It is a major object of this invention to provide a control arm on the mower which carries the cord and regulates its disposition during mowing operation so as to avoid these troublesome and aggravating problems.

An important object is achieved by the structural arrangement and mounting of the control arm relative to the handle and to the switch means on the handle, whereby the component parts of such mower assembly cooperate for most efficient operation of the control arm in swinging the extension cord to one side or the other of the handle incident to locating and retaining the cord out of the way of the operator and the mower, and for most convenient manipulation of the control arm and switch means by the operator.

Another important objective is attained by the provision of a mower assembly in which a bracket is secured to the upper end of the handle and provides an upright tube in which one arm portion of a control arm is pivotally mounted and from which another arm portion extends laterally of the handle, by the provision of switch means mounted on the handle adjacent the tube which is operatively connected to a wire operatively connected to the electric motor, and by the provision of an extension cord extending through a loop provided in the control arm and held by the arm, the extension cord including an electrical connector operatively connected to an electrical connector on the wire. The control arm can be swung from one side to the other of the handle to relocate the extension cord carried by the arm loop as the control arm pivots in the tube socket.

Yet another important objective is realized by the provision of a mower assembly of the type mentioned previously in which tension in the extension cord acts on the control arm through the arm loop to flip the relatively long arm portion from one side to the other of the handle automatically as the relatively short arm portion pivots in the tube socket upon turning the mower at the end of a cut in the direction in which the relatively long arm portion extends.

An important object is afforded by the structural arrangement in which the switch means is mounted on the bracket, and in which the wire interconnecting the electrical motor and switch means extends from and is carried by the bracket above the tube carrying the control arm.

Another important objective is provided by the provision of a handle that includes a pair of elongated bars secured in adjacent side-by-side relation, and by the mounting of the bracket to the handle bars with the tube located substantially therebetween so that the arm engages the handle bars as the arm is swung from one side to the other whereby to determine the lateral position of the relatively long arm portion of the control arm at opposite sides of the handle.

Still another important objective is achieved by the provision of an assembly in which the bracket includes a switch box adjacent the tube, and in which the motor wire extends up along the handle, is operatively connected to the switch mounted in the switch box, and extends outwardly of the box adjacent the tube and control arm.

An important objective is attained by the provision of a handle that includes a pair of elongated bars secured in adjacent side-by-side relation and having oppositely and laterally extending hand grips providing an apex at the upper end of the handle, and by the location of a switch box of the bracket between the handle bars in the apex between the hand grips, and by the extension of the motor wire from the switch box along the relatively long arm portion of the control arm so that the electrical connectors of such wire and the extension cord are operatively interconnected adjacent to and inwardly of the arm loop.

Another important object is realized by providing an extension cord control for an electric mower that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawing, in which:

FIG. 1 is a fragmentary, front elevational view of the mower assembly including the extension cord control, the other limit position of the control arm being illustrated by broken lines;

FIG. 2 is a fragmentary, rear elevational view of the mower assembly shown in FIG. 1;

FIG. 3 is an exploded, perspective view of the mounting bracket, switch means and control arm, and FIG. 4 is a diagrammatic view illustrating the automatic flipping of the control arm during mowing operation.

Referring now by characters of reference to the drawing, it will be understood, although not shown, that the electric lawn mower includes the usual deck frame mounted on ground wheels and carrying a cutting blade. An electric motor constituting the power means is drivingly connected to the cutting blade. A handle generally indicated by 10 is attached to the rear of the mower frame and extends rearwardly and upwardly from such frame. The handle 10 is utilized to guide and push the mower during mowing operation. The mower, as described above, is conventional.

In the present mower assembly, the handle 10 consists of a pair of elongated bars 11 and 12 arranged and secured in side-by-side parallel relation with a small space therebetween. The upper ends of the handle bars 11 and 12 curve laterally outward in opposed relation to provide a pair of hand grips 13 and to provide an apex 14 between the bars 11 and 12 at the upper end of handle 10 between hand grips 13.

The construction of a mounting bracket generally indicated by 15, is best shown in FIG. 3. The bracket 15 includes a flat, substantially vertical plate 16 located in the space between handle bars 11 and 12 at the upper end of handle 10. For reasons which will later appear, the plate 16 is provided with a slot 17 aligned with the opposed handle bars 11 and 12.

Formed integrally with the rear edge of plate 16 is a right angle flange 20 that extends behind and embraces the rear side of handle bar 12, as is best seen in FIG. 2. Formed integrally from the front of plate 16 is a substantially upright tube 21 that is open at the top and the bottom, and which provides an elongate socket 22. The tube 21 is located between the handle bars 11 and 12 and at the front of handle 10, as is best seen in FIG. 1.

The bracket 15 is secured to handle 10 by a bolt 23 passed transversely through the handle bars 11 and 12 and passed through the plate slot 17, the bolt 23 being drawn-up tight by a nut 24 so as to clamp the bracket plate 16 between bars 11 and 12.

The bracket 15 includes an integral switch box referred to by 25, that is substantially triangular in shape and formed integrally with the plate 16. Specifically, the switch box 25 has oppositely curved and disposed side walls 26 and 27 integrally depending from a slightly arched top wall 30 and tapering downward to the top of bracket plate 16. The switch box 25 is closed by a front panel 31 and a rear panel 32, the front and rear panels 31 and 32 having a substantially triangular configuration conforming to and compatible with the triangular, peripheral shape of the switch box 25, as defined by the side and top walls 26, 27 and 30 respectively. The rear panel 32 is provided with a pair of tabs 33 that extend forwardly and overlap side wall 27 of the switch box 25. A pair of screws 34 (one of which is shown in FIG. 3) pass through and interconnect the side wall 27 and tabs 33 so as to secure the rear panel 32.

The switch box 25 is located in the apex 14 at the upper end of the handle 10. The curved side walls 26 and 27 of switch box 25 conform to and are contiguous with the curved handle bars 11 and 12 defining such apex 14 between the hand grips 13. The switch box 25 occupies the apex 14 and its top wall 30 substantially bridges the hand grips 13.

A control arm generally indicated by 35, is mounted to the bracket 15. The control arm 35 is substantially L-shaped and includes a relatively short arm portion 36 pivotally mounted in the tube socket 22 and extending through the tube 21, and includes a relatively long arm portion 37 extending laterally from the top of tube 21 to one side or the other of handle 10 as the short arm portion 36 pivots in tube 21. Formed at the outer end of the relatively long arm portion 37 is a loop 40, the purpose and function of which will become clear upon later description of parts.

Mounted within the switch box 25 is a switch 41 having a threaded fitting 42 extending upwardly through a compatible hole 43 formed in the top wall 30, and threadedly engaging a lock nut 44, the lock nut 44 clamping the switch 41 in place. The switch includes a toggle 45 extending above the switch box 25 for convenient access for digital actuation. The switch 41 includes terminals 46.

Operatively connected to the electric motor is a current-conducting wire 47, the wire 47 extending upwardly along the rear of handle 10 and into the switch box 25 through the rear panel 32. The wire 47 is operatively connected to the terminals 46 of switch 41, and then emerges from the front panel 31 of switch box 25 immediately above the pivot tube 21 to provide a wire length 50 that extends generally along the relatively long arm portion 37 of control arm 35. An electrical connector 51 is fastened to the end of wire length 50.

An extension cord 52 is operatively connected to the usual and conventional power source and extends to the electric mower. The extension cord 52 is inserted through and is held by the arm loop 40. Attached to the end of the extension cord 52 is an electrical connector 53 located just inwardly of the arm loop 40. It will be understood that the electrical connectors 51 and 53 are interconnected to complete the circuit necessary to energize the electric motor, such energization being controlled by selective manipulation of switch 41 by the operator. The wire length 50 is of sufficient length so that the electrical connector 53 will engage the arm loop 40 when tension is applied to the electric cord 52, whereby to prevent unintentional and accidental disengagement of the electrical connectors 51 and 53, and to preclude disconnection of the extension cord from the control arm 35. However, the wire length 50 is short enough so that it does extend substantially along the arm portion 37 without providing any excessive slack.

The operator can readily grip the arm portion 37 of the control arm 35 and flip it from one side to the other of handle 10 as is indicated by the broken line illustration of control arm 35 in FIG. 1. Because the arm loop 40 grips the extension cord 52, the control arm 35 will flip the extension cord 52 correspondingly to one side or the other of handle 10.

It will be understood that the present mower assembly locates the control arm 35 at the upper end of handle 10 immediately adjacent the hand grips 13 so that the operator has only to move his hand a short distance from the hand grip 13 in order to manipulate the control arm 35 effectively.

Moreover, because the present mower assembly locates the pivot tubes 21 and the control arm 35 at the upper end of handle 10, the control arm 35 is more effective in holding the extension cord 52 away from the legs and feet of the operator and out of the path of the mower, than if such control arm 35 were located at the lower end of handle 10.

This mower assembly provides the switch box 25 immediately adjacent the top of pivot tube 21 so that the wire length 50 emerges from the switch box 25 at a point just above and closely adjacent to the upper end of tube 21 so that the wire length 50 can extend closely adjacent to and along the length of arm portion 37 to its connection with the extension cord 52 carried by the arm loop 40. This structural arrangement precludes any excess slack in the wire length 50 and prevents such wire length 50 from interfering with the operator during mowing operation, and from interfering with the other component parts of this assembly and the operating parts of the mower.

Upon swinging the control arm 35 from one side to the other of handle 10, the inner end of arm portion 37 engages either the handle bar 11 or 12 to determine the lateral position of such arm portion 37. These interengaging stops are provided by the particular arrangement and construction of the pivot tube 21 located between the handle bars 11 and 12 and in front of the handle 10.

An angle strip 54 is secured to one side of handle 10 by the bolt 23. As is usual, the angle strip 54 opens upwardly. A compatible, oppositely disposed angle strip (not shown) is attached to the same side of handle 10, but below the angle strip 54. These angle strips cooperate to provide a holder for storing the extension cord 52 when the cord 52 is disconnected. The cord 52 is merely wrapped on and between these angle strips 54.

It is thought that the operation and functional advantages of the present improvements have become fully apparent from the foregoing detailed description of parts, but for completeness of disclosure, the usage of the mower incorporating such assembly will be briefly described. It will be assumed that the extension cord 52 is unwrapped from the angle strips 54 and that one end is operatively connected to the power source while the opposite end is located in the arm loop 40 with the electrical connectors 51 and 53 operatively connected just inwardly of the arm loop 40.

The operator actuates the switch toggle 45 to energize the electric motor, and then pushes the mower by exerting force on the hand grips 13, utilizing the handle 10 to guide the mower in the desired direction of cut. In order to keep the extension cord 52 away from the operator's legs and feet and to keep the cord 52 out of the path of the mower, the operator will swing the control arm 35 from one side or the other of handle 10, the lateral positions of the control arm 35 being illustrated in FIG. 1. For example, if the lateral position of the control arm 35 as shown in full lines in FIG. 1 holds the extension cord 52 in the desired location out of the way of both operator and mower during movement of the mower in one direction, it may be necessary for the operator to swing the control arm 35 to the opposite lateral position illustrated in broken lines in FIG. 1 when the mower is pushed in the opposite direction in order to maintain the extension safely clear of operator and mower.

FIG. 4 illustrates diagrammatically a semi-automatic feature of the control arm 35. It will be understood that by turning the mower at the end of a cut in the direction in which the control arm 35 extends, the inherent tension in the extension cord 52, acting through the engagement with the arm loop 40, will cause the control arm 35 to flip automatically to the opposite side of handle 10 when the included angle between the control arm and the extension cord is an acute angle. FIG. 4 illustrates diagrammatically a complete cycle of operation in order to clearly disclose this phenomenon.

Although the invention has been described by making detailed reference to a single preferred embodiment, such detail is to be understood in an instructive, rather than in any restrictive sense, many variants being possible within the scope of the claims hereunto appended.

I claim as my invention:

1. In a mower having a power means, a wire operatively connected to the power means, and an elongated handle:
    (a) a bracket secured to the upper end of the handle, the bracket including a substantially upright tube providing a socket,
    (b) a control arm including a first arm portion pivotally mounted in the tube socket and a second arm portion extending laterally from the tube and handle,
    (c) the second arm portion having a loop,
    (d) a switch means mounted on the handle adjacent the tube,
    (e) the said wire being operatively connected to the switch means and including a wire length with an electrical connector at the upper end of the handle, and
    (f) an extension cord extending through the arm loop and held by the control arm, the extension cord including an electrical connector operatively connected to the electrical connector of said wire length, the loop engaging the extension cord to preclude tension in said wire length, and transfer such tension to the control arm, and
    (g) the second arm portion being swung from one side to the other forwardly of the handle to relocate the extension cord carried by the arm loop as the first arm portion pivots in the tube socket.

2. The mower assembly as defined in claim 1, in which:
    (h) tension in the extension cord acts on the control arm through the engagement of the arm loop with the extension cord to slip the second arm portion from one side to the other of the handle automatically as the first arm portion pivots in the tube socket upon turning the mower at the end of a cut in the direction in which the second arm portion extends when the included angle between the extension cord and the control arm is an acute angle.

3. The mower assembly as defined in claim 1, in which:
    (h) the handle includes a pair of elongated bars secured in adjacent side-by-side relation, the bars having oppositely and laterally extending hand grips providing an apex at the upper end of the handle,
    (i) the bracket is located between and attached to the handle bars with the pivot tube located substantially between the bars,
    (j) the bracket includes a switch box located between the handle bars in the apex between the hand grips,
    (k) a switch is mounted in the box,
    (l) the said wire extends up along the handle and into the box, the wire being operatively connected to the switch,
    (m) the said wire length extends through the box just above the pivot tube, and extends substantially along the relatively long arm portion, and
    (n) the electrical connectors of said wire length and the extension cord interconnecting adjacent to and inwardly of the arm loop, the arm loop engaging the electrical connector on the extension cord to retain the cord and preclude any strain between the connector tending to disengage them.

4. The mower assembly as defined in claim 1, in which:
    (h) the handle includes a pair of elongated bars secured in adjacent side-by-side relation, the bars having oppositely and laterally extending hand grips providing an apex at the upper end of the handles,
    (i) the bracket includes a plate located between and attached to the handle bars,
    (j) a fastener extends between the handle bars and the plate,
    (k) the plate has a flange embracing the rear of one of the handle bars to provide couple resistance precluding pivotal movement of the bracket about the fastener,
    (l) the pivot tube is provided on the front of the plate and is located substantially between the bars at the front of the handle,
    (m) a switch box is carred by the plate and is located between the handle bars in the apex between the hand grips, and
    (n) a switch is mounted in the box.

References Cited

UNITED STATES PATENTS 2,167,222   7/1939   Shelor _____ 56—25.4
2,760,328   8/1956   Siebring _____ 56—26

ROBERT K. SCHAEFER, *Primary Examiner.*

H. BURKS, *Assistant Examiner.*